(12) United States Patent
Han et al.

(10) Patent No.: US 11,338,284 B2
(45) Date of Patent: May 24, 2022

(54) MICROFLUIDIC SYSTEM AND MICROFLUIDIC METHOD

(71) Applicant: BOE TECHNOLOGY GROUP CO., LTD., Beijing (CN)

(72) Inventors: Yanling Han, Beijing (CN); Xue Dong, Beijing (CN); Haisheng Wang, Beijing (CN); Xiaoliang Ding, Beijing (CN); Yingming Liu, Beijing (CN); Yuzhen Guo, Beijing (CN); Xueyou Cao, Beijing (CN); Ping Zhang, Beijing (CN); Pengpeng Wang, Beijing (CN); Chih Jen Cheng, Beijing (CN); Wei Liu, Beijing (CN); Yangbing Li, Beijing (CN); Likai Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 427 days.

(21) Appl. No.: 15/956,119

(22) Filed: Apr. 18, 2018

(65) Prior Publication Data
US 2019/0070602 A1 Mar. 7, 2019

(30) Foreign Application Priority Data

Sep. 6, 2017 (CN) .......................... 201710796991.2

(51) Int. Cl.
*B01L 3/00* (2006.01)
*G02B 26/00* (2006.01)
*G01N 27/48* (2006.01)

(52) U.S. Cl.
CPC ... *B01L 3/502707* (2013.01); *B01L 3/502792* (2013.01); *G02B 26/005* (2013.01);
(Continued)

(58) Field of Classification Search
CPC ......... B01L 3/502707; B01L 3/502792; B01L 2400/0427; B01L 2200/143; B01L 2300/0645; G02B 26/005; G01N 27/48
See application file for complete search history.

(56) References Cited

U.S. PATENT DOCUMENTS

2011/0247938 A1 10/2011 Wang et al.
2014/0054174 A1 2/2014 Wang

FOREIGN PATENT DOCUMENTS

CN 101773814 A 7/2010
CN 102650512 A 8/2012
(Continued)

OTHER PUBLICATIONS

The First Chinese Office Action dated Mar. 21, 2019; Appln. No. 201710796991.2.

*Primary Examiner* — Samuel P Siefke (57) ABSTRACT

A microfluidic system and method are disclosed. The microfluidic system includes: a first base substrate; a second base substrate opposite to the first base substrate; a first electrode on a side of the first base substrate close to the second base substrate; and a second electrode on a side of the second base substrate close to the first base substrate, the first base substrate and the second base substrate forms a cell, the cell is configured to receive a liquid to be detected, the first electrode and the second electrode are configured to drive the liquid to be detected during a first time period, and output a capacitance signal between the first electrode and the second electrode during a second time period.

12 Claims, 4 Drawing Sheets

(52) U.S. Cl.
  CPC . *B01L 2200/143* (2013.01); *B01L 2300/0645* (2013.01); *B01L 2400/0427* (2013.01); *G01N 27/48* (2013.01)

(56) References Cited

FOREIGN PATENT DOCUMENTS

| CN | 102671724 A | 9/2012 |
|---|---|---|
| CN | 104903003 A | 9/2015 |
| CN | 106432767 A | 2/2017 |
| CN | 106933142 A | 7/2017 |

MICROFLUIDIC SYSTEM AND MICROFLUIDIC METHOD

CROSS-REFERENCE TO RELATED APPLICATIONS

The present application claims priority of China Patent application No. 201710796991.2 filed on Sep. 6, 2017, the content of which is incorporated in its entirety as portion of the present application by reference herein.

TECHNICAL FIELD

At least one example of the present disclosure relates to a microfluidic system and a microfluidic method.

BACKGROUND

At present, microfluidic technology becomes a research hot spot, and can be applied in many technical fields, such as: medical, chemistry, biology and so on.

SUMMARY

At least one example of the present disclosure provides a microfluidic system and a microfluidic method, which can be applied to perform liquid operation/control and detection.

At least one example of the present disclosure provides a microfluidic system, including: a first base substrate; a second base substrate opposite to the first base substrate; a first electrode on a side of the first base substrate close to the second base substrate; and a second electrode on a side of the second base substrate close to the first base substrate, wherein the first base substrate and the second base substrate forms a cell, the cell is configured to receive a liquid to be detected, the first electrode and the second electrode are configured to drive the liquid to be detected during a first time period, and output a capacitance signal between the first electrode and the second electrode during a second time period.

The microfluidic system according to an example of the present disclosure, the first electrode includes a plurality of sub portions insulated from each other, each of the plurality of sub portions includes a plurality of first sub electrodes insulated from each other, and the second electrode includes a plurality of second sub electrodes insulated from each other.

The microfluidic system according to an example of the present disclosure, an orthographic projection of each of the plurality of second sub electrodes on the first base substrate is overlapped with an orthographic projection of one of the plurality of sub portions on the first base substrate.

The microfluidic system according to an example of the present disclosure, the microfluidic system further includes: a thin film transistor connected with each of the plurality of first sub electrodes, wherein the first sub electrode is electrically connected with a drain electrode of the thin film transistor.

The microfluidic system according to an example of the present disclosure, gate electrodes of the thin film transistors in a same row are connected with a same gate line.

The microfluidic system according to an example of the present disclosure, the plurality of sub portions are arranged along a column direction, and source electrodes of the thin film transistors in a same column are connected with a same data line.

The microfluidic system according to an example of the present disclosure, the microfluidic system further includes: a signal adjusting unit, wherein the signal adjusting unit is configured to adjust a first driving signal inputted to the first sub electrode in real time according to a capacitance detection result.

The microfluidic system according to an example of the present disclosure, the signal adjusting unit is configured to adjust the first driving signal inputted to the first sub electrode by adjusting a position of a turned-on thin film transistor and a source driving signal inputted to a source electrode of the turned-on thin film transistor.

The microfluidic system according to an example of the present disclosure, a source electrode of the thin film transistor is connected with a detection-and-source driver, a gate electrode of the thin film transistor is connected with a gate driver, the detection-and-source driver and the gate driver are respectively connected with the signal adjusting unit; the detection-and-source driver is configured to input the source driving signal to the source electrode of the turned-on thin film transistor in the first time period, and receive the capacitance signal sensed by the first sub electrode to detect a capacitance change between the first electrode and a corresponding second sub electrode.

At least one example of the present disclosure provides a microfluidic method of any one of the above-mentioned microfluidic systems, employing a time division method to drive and perform capacitance detection, the method includes: during the first time period, driving the liquid to be detected utilizing the first electrode and the second electrode; and during the second time period, outputting the capacitance signal between the first electrode and the second electrode.

The microfluidic method according to an example of the present disclosure, the method further includes: during the first time period, inputting a common signal to the second electrode, and inputting a first driving signal to the first electrode.

The microfluidic method according to an example of the present disclosure, the first driving signal is an alternating current signal.

The microfluidic method according to an example of the present disclosure, the method further includes: during the second time period, inputting a second driving signal to the second electrode, floating the first electrode, outputting the capacitance signal generated by sensing by the first electrode.

The microfluidic method according to an example of the present disclosure, the second driving signal is an alternating current signal.

The microfluidic method according to an example of the present disclosure, the method further includes: adjusting the first driving signal in real time according to a capacitance detection result.

The microfluidic method according to an example of the present disclosure, the method includes a plurality of first time periods and a plurality of second time periods alternately arranged, and the method further includes: according to capacitance detection result of a previous second time period, adjusting the first driving signal inputted to the first electrode of a subsequent first time period.

The microfluidic method according to an example of the present disclosure, the first electrode includes a plurality of first sub electrodes insulated from each other, each of the plurality of first sub electrodes is electrically connected with a thin film transistor, the method further includes: adjusting the first driving signal inputted to the first sub electrode by adjusting a gate driving signal and a source driving signal inputted to the thin film transistor in real time according to the capacitance detection result.

BRIEF DESCRIPTION OF THE DRAWINGS

In order to clearly illustrate the technical solution of examples of the present disclosure, the drawings of the examples will be briefly described in the following, it is obvious that the drawings in the description are only related to some examples of the present disclosure and not limited to the present disclosure.

DETAILED DESCRIPTION

In order to make objects, technical details and advantages of the examples of the present disclosure apparently, the technical solutions of the examples will be described in a clearly and fully understandable way in connection with the drawings related to the examples of the present disclosure. It is obvious that the described examples are just a part but not all of the examples of the present disclosure. Based on the described examples herein, a person having ordinary skill in the art may obtain other example(s), without any inventive work, which should be within the scope of the disclosure.

Unless otherwise defined, the technical terms or scientific terms used in the present disclosure have the same meanings as commonly understood by one of ordinary skill in the art to which the present disclosure belongs. The terms "first", "second", etc., which are used in the present disclosure, are not intended to indicate any sequence, amount or importance, but distinguish various components. The terms "comprises", "comprising", "includes", "including", etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
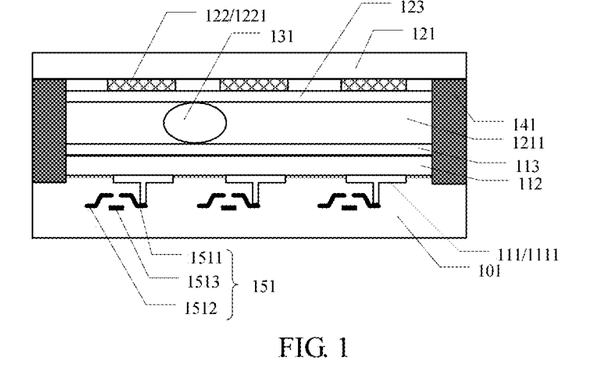
FIG. 1 is a schematic diagram of a microfluidic system provided by an example of the present disclosure.

As illustrated in FIG. 1, an example of the present disclosure provides a microfluidic system, including: a first base substrate 101; a second base substrate 121 opposite to the first base substrate 101; a first electrode 111 on a side of the first base substrate 101 close to the second base substrate 121; a second electrode 122 on a side of the second base substrate 121 close to the first base substrate 101, the second electrode 122 and the first electrode 111 being insulated from each other.

The first base substrate 101 and the second base substrate 121 forms a cell 1211, the cell 1211 is configured to receive a liquid 131 to be detected, the first electrode 111 and the second electrode 122 are configured to drive the liquid 131 to be detected during a first time period, and output a capacitance signal between the first electrode 111 and the second electrode 122 during a second time period. The capacitance signal can change with the change of the capacitance between the first electrode 111 and the second electrode 122, in this way, a capacitance between the first electrode 111 and the second electrode 122 can be detected. For example, the capacitance signal can include a voltage signal and/or a current signal.

The first electrode 111 and the second electrode 122 can form a capacitive sensor. For example, the second electrode 122 and the first electrode 111 can form an electric filed therebetween, and the formed electric field can operate/control the liquid 131 to be detected. The liquid 131 to be detected can be a liquid drop, a fluid, or the like. Hereafter, a case where the liquid to be detected is a liquid drop will be described as an example.

For example, the microfluidic system can control the operations such as movement, separation and combination, and reaction of a liquid drop. For example, the liquid to be detected can be a liquid introducing to the microfluidic system, or a liquid obtained after reaction in the microfluidic system of a liquid introducing to the microfluidic system, which is not limited herein.

An example of the present disclosure provides a microfluidic system, applied to drive liquid and perform capacitance detection in a time division mode, which can acquire a capacitance detection result in real time. The first electrode 111 and the second electrode 122 can not only serve as electrodes for driving the liquid 131 to be detected, but also serve as electrodes of capacitance detection. Besides, the microfluidic system is easy to manufacture, the liquid therein is easy to drive, and the detection method is simple.

For example, during the first time period, the liquid to be detected can be driven by inputting a common signal to the second electrode 122, and inputting a first driving signal to the first electrode 111. For example, during the second time period, a sensing capacitance can be read by inputting a second driving signal to the second electrode 122 and floating the first electrode 111, so as to realize capacitance detection. For example, "floating" refers to an action which does not apply a signal, or apply no signal.

As illustrated in FIG. 1, in the microfluidic system provided by an example of the present disclosure, the first electrode 111 can be provided with an insulating layer 112 and a first hydrophobic layer 113 thereon, and the second electrode 122 can be provided with a second hydrophobic layer 123 thereon.

The microfluidic system provided by the example of the present disclosure is an EWOD (electrowetting-on-dielectric)-based microfluidic system, a digital microfluidic technology based on EWOD refers to a technology, on a chip containing an insulating medium, which make a liquid drop produce asymmetric deformation by applying a voltage signal to change a contact angle of the liquid drop on a dielectric, so as to produce an interior force to operate the liquid drop. This technology draws more and more attentions and is regarded as a most promising technology in the microfluidic field due to the advantages such as easy to realize, convenient to operate, easy to control, and high driving ability.

For example, a material of the first base substrate 101 and the second base substrate 121 include glass. The first base substrate 101 and the second base substrate 121 are not limited to glass substrates, and can be substrates of other materials. Employing a glass substrate can avoid expensive experimental device, and can save the costs.

Figure 2:
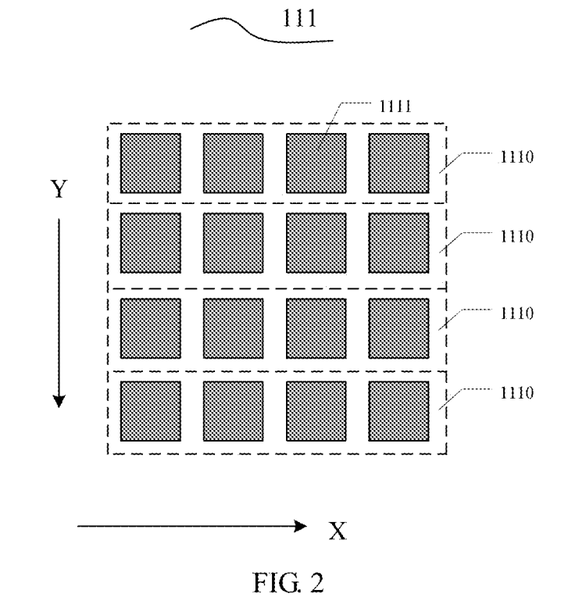
FIG. 2 is a plan view of a first electrode in a microfluidic system provided by an example of the present disclosure.

As illustrated in FIG. 2, in the microfluidic system provided by an example of the present disclosure, the first electrode 111 includes a plurality of sub portions 1110 insulated from each other, and each of the plurality of sub portions 1110 includes a plurality of first sub electrodes 1111 insulated from each other. The plurality of first sub electrodes 1111 included by each of the sub portions 1110 can be arranged along a first direction X, and the plurality of sub portions 1110 can be arranged along a second direction Y. For example, the first direction X is a row direction, and the second direction Y is a column direction. The first sub electrode 1111 can be inputted with a first driving signal to control/operate the liquid/liquid drop to be detected. The first sub electrodes 1111 included by the first electrode 111 can be arranged in an array.

Figure 3:
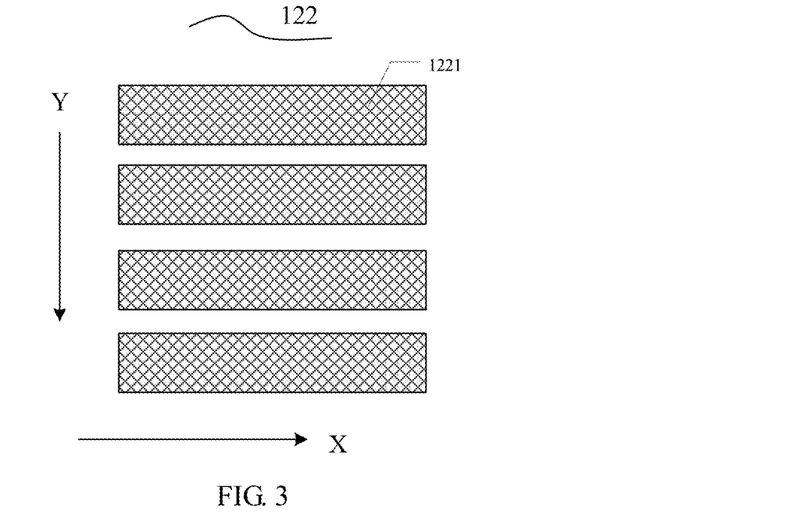
FIG. 3 is a plan view of a second electrode in a microfluidic system provided by an example of the present disclosure.

As illustrated in FIG. 3, the second electrode 122 includes a plurality of second sub electrodes 1221 insulated from each other. The microfluidic system provided by the example realizes a real time detection feedback of liquid drop by applying a liquid drop control signal and a liquid drop detection signal in a time division mode, through a pattern design of the second electrode, which can be convenient to adjust the first driving signal in time to realize a more precise control of the liquid drop. For example, the plurality of second sub electrodes 1221 can be extended along the first direction X, and arranged in the second direction Y. For example, each of the first sub electrodes 1111 and the second sub electrode 1221 opposite thereto can form a capacitor Cst, and the operation situation of the liquid drop can be acquired by detecting the capacitance of the Cst.

Figure 4:
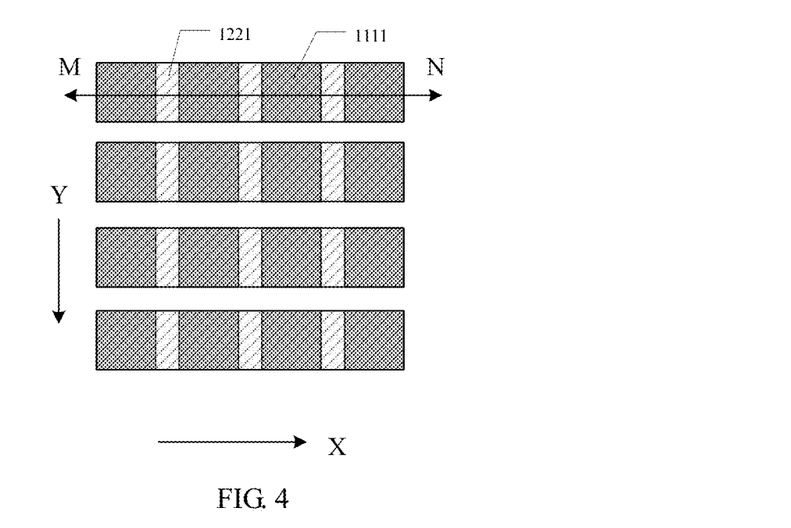
FIG. 4 is a plan view of a first electrode and a second electrode in a microfluidic system provided by an example of the present disclosure.

As illustrated in FIG. 4, in an example, in order to conveniently form an electric field and/or a capacitor, an orthographic projection of the second sub electrode 1221 on the first base substrate 101 is overlapped with an orthographic projection of one of the sub portions 1110 on the first base substrate 101. That is, the second sub electrode 1221 and the sub portion 1110 have an overlap portion. As illustrated in FIG. 4, the second sub electrode 1221 and the sub portion 1110 are opposite to each other. The second sub electrode 1221 is a strip-shaped electrode, which is opposite to the sub portion 1110.

FIG. 4 is a plan view of a first electrode 111 and a second electrode 122 in a microfluidic system provided by an example of the present disclosure, i.e., a view of a first electrode 111 and a second electrode 122 in a direction perpendicular to the first base substrate 101.

Figure 5:
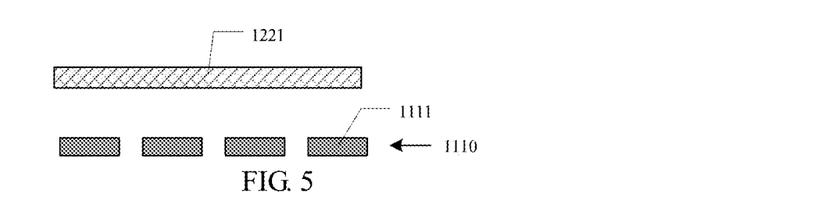
FIG. 5 is a sectional view of a first electrode and a second electrode in a microfluidic system provided by an example of the present disclosure.

FIG. 5 is a sectional view of a first electrode 111 and a second electrode 122 taken along MN line in FIG. 4. The second sub electrode 1221 is opposite to the plurality of first sub electrodes 1111 of the sub portion 1110.

Figure 6A:
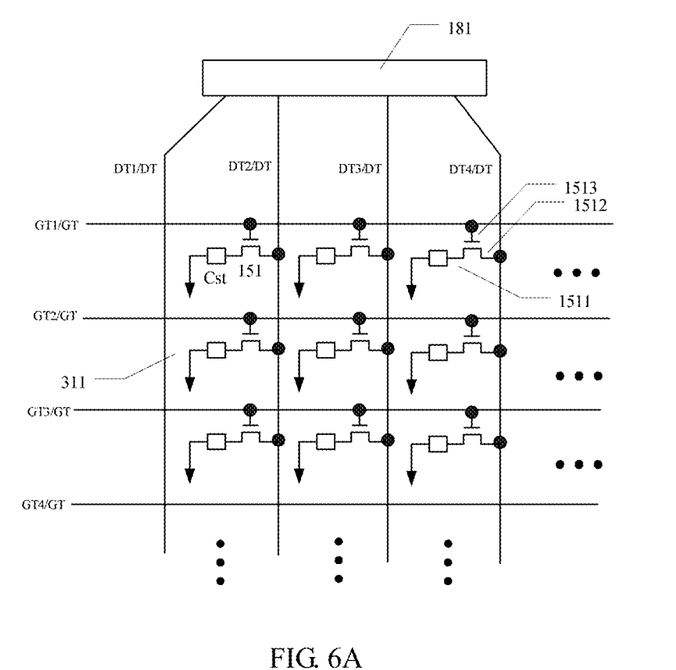
FIG. 6A is a schematic diagram illustrating a circuit and a structure of a microfluidic system provided by an example of the present disclosure.

As illustrated in FIG. 6A, in an example, the microfluidic system further includes a thin film transistor (TFT) 151 (TFT 151 can also refer to FIG. 1) electrically connected with the first sub electrode 1111. For example, the TFT 151 can include a drain electrode 1511, a source electrode 1512, and a gate electrode 1513 (referring to FIG. 1). The drain electrode 1511 can be electrically connected with the first sub electrode 1111. The source electrode 1512 can be electrically connected with a data line (DT). The gate electrode 1513 can be electrically connected with a gate line (GT). For example, the gate line GT can be configured to input a gate driving signal to the TFT 151, the data line DT is further configured to read a detection signal/a capacitance signal. For example, the gate electrodes of the thin film transistors in a same row can be electrically connected, and the source electrodes of the thin film transistors in a same column can be electrically connected. For example, each of the first sub electrodes can be independently controlled by scanning the gate lines row-by-row and inputting a data signal column-by-column. For example, the plurality of gate lines and the plurality of data lines are insulated from other, and are intersected with each other to form a plurality of detection units 311. Taking a detection unit 311 including m rows and n columns as an example, m×n electrode wires (including gate lines and data lines) can be replaced with m+n electrode wires (including gate lines in rows and data lines in columns), which can largely reduce the number of wires, and the configuration position of the circuit is not limited thereto.

For example, as illustrated in FIG. 6A, the plurality of TFTs 151 can be arranged in an array. For example, in order to reduce the number of the wires, the plurality of first sub electrodes 1111 included by each of the sub portions 1110 are connected with the same gate line GT. For example, gate electrodes 1513 of the thin film transistors 151 connected with the first sub electrodes 1111 included by each of the sub portions 1110 are connected with the same gate line GT. For example, the source electrodes 1511 of TFTs 151 connected with the first sub electrodes 1111 in the same column are electrically connected with the same data line DT.

For example, the thin film transistors 151 in the same row are connected with the same gate line GT, the thin film transistors 151 in the same column are connected with the same data line DT. FIG. 6A totally illustrates four gate lines GT1-GT4, and four data lines DT1-DT4, but the examples of the present disclosure are not limited thereto. The number of the data lines DT and the gate lines GT can be determined as required. The gate electrodes 1513 of the TFTs 151 in the same row are connected with the same gate line GT, the source electrodes 1511 of the TFTs 151 in the same column are connected with the same data line DT.

As illustrated in FIG. 6A, the data lines DT can be electrically connected with a detection-and-source driver 181. For example, the detection-and-source driver 181 can be an integrated circuit (IC). For example, the data lines DT can be connected to different pins of the detection-and-source driver 181. The detection-and-source driver 181 is configured to input a source driving signal to the source electrode 1512 of the thin film transistor 151 during the first time period, to apply a signal to a corresponding first sub electrode 111I, so as to further drive the liquid 131 to be detected to move, and receive sensing capacitance signal of the first sub electrode connected with the thin film transistor 151 during the second time period, to detect the capacitance change between the first electrode 111 and the corresponding second sub electrode 1221, so as to further detect information such as the position and the shape of the liquid 131 to be detected.

As illustrated in FIG. 6A, the sensing capacitances can be read out one-by-one by selecting the thin film transistors, and the sensing capacitance signals can be read by the detection-and-source driver 181 through the data lines DT.

For example, as illustrated in FIG. 6A, one end of the capacitor Cst is the second electrode 122 (second sub electrode 1221), and the other end of the capacitor Cst is the first electrode 111 (first sub electrode 1111), which can be connected to the data line DT through the TFT 151.

Figure 6B:
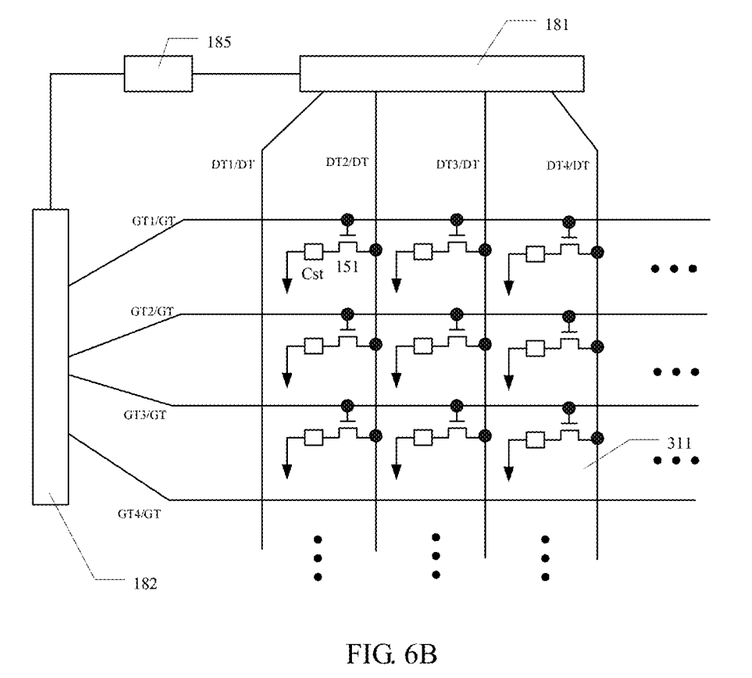
FIG. 6B is a schematic diagram illustrating a circuit and a structure of another microfluidic system provided by an example of the present disclosure.

FIG. 6B is a schematic diagram illustrating a circuit and a structure of a microfluidic system provided by an example of the present disclosure. The gate lines GT can be connected with a gate driver 182. The gate driver 182 is configured to provide a gate driving signal to each row of thin film transistors 151. For example, the gate driver 182 can be an integrated circuit, a gate driver on array (GOA), or the like.

For example, every first sub electrode 1111 can be independently controlled by selecting the gate line m through a gate driving signal, and selecting the data line n through the source driving signal.

As illustrated in FIG. 6B, for example, the microfluidic system further includes a signal adjusting unit 185. The signal adjusting unit 185 can be configured to adjust the first driving signal inputted to the first sub electrode 1111 in a subsequent first time period according to the capacitance detection result of a previous second time period (for example, can be realized by adjusting the source driving signal and the gate driving signal inputted to the thin film transistor 151), in this way, the real time precise control of liquid 131 to be detected can be realized. For example, it can be determined that whether the liquid to be detected deviates from a predetermined motion trail through the capacitance detection result, if the liquid to be detected deviates from the predetermined motion trail, the first driving signal inputted to the first sub electrodes can be adjusted to adjust the real motion trail to the predetermined motion trail, which is not limited thereto.

For example, the signal adjusting unit 185 is configured to adjust the first driving signal inputted to the first sub electrodes 1111 in real time according to the capacitance detection result.

For example, the signal adjusting unit 185 is configured to adjust the gate driving signals and source driving signals inputted to the plurality of thin film transistors 151 in real time according to the capacitance detection result, so as to adjust the first driving signal inputted to each of the first sub electrodes 111. For example, the first driving signal inputted to the first sub electrode is adjusted by adjusting a position of a turned-on thin film transistor and a source driving signal inputted to a source electrode of the turned-on thin film transistor. For example, for the same first sub electrode 1111, the source driving signal can be the same as the first driving signal, which is not limited thereto.

For example, the source electrode 1512 of the thin film transistor 151 is connected with the detection-and-source driver 181, the gate electrode 1513 of the thin film transistor 151 can be connected with the gate driver 182, and the detection-and-source driver 181 and the gate driver 182 are respectively connected with the signal adjusting unit 185.

The microfluidic system in the examples of the present disclosure can include one or more processors and one or more memories. The processor can process data signals, and can include various computing architectures, such as a complex instruction set computer (CISC) architecture, a reduced instruction set computer (RISC) architecture or an architecture for implementing a combination of multiple instruction sets. The memory can store instructions and/or data executed by the processor. These instructions and/or data can include codes, which are configured to realize some functions or all functions of one or more devices described in the examples of the present disclosure. For example, the memories can include a dynamic random access memory (DRAM), a static random access memory (SRAM), a flash memory, optical memory, or other memories well-known to those skilled in the art.

In some examples of the present disclosure, the signal adjusting unit can include codes and programs stored in the memories; and the processor can execute the codes and programs to realize some functions or all functions of the above-mentioned signal adjusting unit.

In some examples of the present disclosure, the signal adjusting unit can be a specialized hardware device and configured to achieve some functions or all functions of the above-mentioned signal adjusting unit. For example, the signal adjusting unit can be a circuit board or a combination of a plurality of circuit boards, which are used to realize the above-mentioned functions. In the examples of the present disclosure, the circuit board or the combination of a plurality of circuit boards can include: (1) one or more processors; (2) one or more non-temporary and computer-readable memories connected with the processors; and (3) processor-executable firmware stored in the memories.

The microfluidic system provided by an example of the present disclosure, in order to operate the liquid/liquid drop to be detected in real time, the first driving signal applied to the first electrode 111/first sub electrode 1111 is adjusted in real time according to the capacitance detection result.

The microfluidic method of a microfluidic system according to any examples of the present disclosure employs a time division method to drive liquid and perform capacitance detection, the method includes: during the first time period, driving the liquid to be detected utilizing the first electrode 111 and the second electrode 122; and during the second time period, outputting the capacitance signal between the first electrode 111 and the second electrode 122.

According to the microfluidic method provided by an example of the present disclosure, the method further includes: during the first time period, inputting a common signal to the second electrode 122, and inputting a first driving signal to the first electrode 111. For example, the first driving signal can be a direct current signal or an alternating current signal (for example, a square wave signal).

According to the microfluidic method provided by an example of the present disclosure, the method further includes: during the second time period, inputting a second driving signal to the second electrode 122, floating the first electrode 111, outputting the capacitance signal generated by sensing by the first electrode 111. For example, the second driving signal can be a direct current signal or an alternating current signal (for example, a square wave signal).

According to the microfluidic method provided by an example of the present disclosure, in order to control the liquid/liquid drop in real time, the method further includes: adjusting the first driving signal in real time according to a capacitance detection result.

Figure 7:
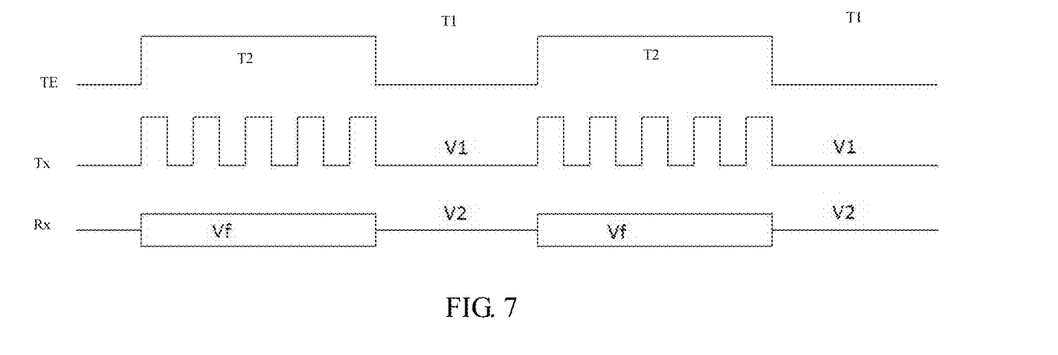
FIG. 7 is a schematic diagram illustrating a driving timing of a microfluidic system provided by an example of the present disclosure.

As illustrated in FIG. 7, an example of the present disclosure provides a driving timing of a microfluidic system (a microfluidic method), employing a time division method. A time period TE includes a first time period T1 and a second time period T2, the first time period T1 is a driving stage, the second time period T2 is a detection stage. For example, the detection result of liquid drop can be fed back to a processor 185 (system processor) in real time, so as to detect the current driving effect, determine whether the liquid drop achieves an expected driving effect or not and whether the first driving signal (driving voltage) is appropriate, and adjust the driving signal (for example, adjust the driving voltage) in real time to achieve a better operation effect of the liquid drop. For example, the detection result can be compared with a predetermined motion trail of liquid, if they are different, the first driving voltage inputted to the first sub electrodes 1111 during the subsequent first time period is adjusted in real time, so as to precisely control the liquid.

In FIG. 7, Tx refers to a driving electrode, Rx refers to a sensing electrode, Vf refers to floating voltage.

For example, in a driving stage of liquid drop, the second electrode 122 (all second sub electrodes 1221) are applied with a common grounded signal V1 (for example, serving as a reference voltage terminal), the first sub electrodes 1111 are selectively applied with a first driving signal V2 (for example, a first driving voltage) by selecting a TFT as required. The function of the first driving signal V2 is to control the operations such as movement, separation and combination of liquid drops, and can be a direct current signal or an alternating square wave signal. For example, if V2 is a direction current signal, it is required to provide the current signal during the driving stage, and the power consumption is higher. For example, if V2 is an alternating square wave, voltage is stored in CL (CL is a total equivalent capacitor of dielectric layer and the liquid drop between an upper electrode and a lower electrode) during a high level stage, the TFT is turned off during a low level stage, however, due to the existence of leak current of TFT, the stored voltage will leak gradually, resulting in decrease of the driving ability. Thus, the driving method of adopting an alternating square wave not only save the power consumption, but also guarantee the driving effect. In addition, the driving of adopting an alternating square wave is favorable to reduce the delay of contact angle and reduce surface ion adsorption, and achieves a better electrowetting effect on dielectric. For example, the frequency of the first driving signal (driving alternating current signal V2) is larger than the resonant frequency of the liquid drop and smaller than the charging frequency of device, so as to achieve a better electrowetting effect. For example, the first time periods and the second time periods are alternately arranged, i.e., the driving stages and the detection stages are alternately arranged. For example, during different first time periods, the first driving signals V2 can be different.

For example, in the detection stage of liquid drop, the second electrode 122/the second sub electrode 1221 can be applied with a second driving signal (for example, a square wave signal), the first sub electrode 1111 is floated, a sensing capacitor is generated, and the capacitances of the sensing capacitor at a place provided with liquid drop and a place not provided with liquid drop are different, and the electrical signal of the sensing capacitance of the first sub electrode 1111 can be read out one-by-one by selecting the TFTs. For example, a position and shape diagram of the liquid drop can be obtained through the electrical signal of the sensing capacitance which is read out, and information of the liquid drop such as the volume and size can be calculated through a corresponding algorithm.

For example, in the microfluidic system, the first electrode 111 and the second electrode 122 can be made of a transparent material, for example, indium tin oxide (ITO).

For example, a manufacturing method of a microfluidic system can refer to the followings.

(1) Forming a second electrode 122 on a second base substrate 121, which can include: depositing by a plasma enhanced chemical vapor deposition (PECVD) method, and etching (for example, including dry etching or wet etching). Or, a strip-shaped electrode can be directly printed. The second electrode is a transparent electrode, such as an ITO electrode. For example, the second electrode 122 is a patterned electrode, and the shape of the second electrode 122 can refer to the description above.

(2) Forming a second hydrophobic layer 123 on the second electrode 122.

(3) Forming a TFT 151 and a first electrode 111 (a driving electrode array) on the first base substrate 101.

(4) Entirely depositing a dielectric insulating layer on the first electrode 111. For example, the dielectric insulating layer can be SiNx, SiOx, or the like.

(5) Forming a first hydrophobic layer 113 on the insulating layer 112, and the first hydrophobic layer 113 can be disposed on an entire surface of the insulating layer 112.

For example, the first hydrophobic layer 113 and the second hydrophobic layer 123 can be coated by a spin coating method, or be formed by firstly depositing a layer of material, for example, SiF, and then producing a hydrophobic material with low surface energy using plasma bombardment. The examples of the present disclosure do not limit the material and manufacturing processes of the hydrophobic layers.

For example, the first base substrate 101 and the second base substrate 121 are cell-assembled to form a cell, and the liquid drop can move in the cell. For example, sealant 141 can be used to bond the first base substrate 101 and the second base substrate 121, but the examples of the present disclosure are not limited thereto. For example, a barrier wall can be manufactured to limit the position of the liquid/liquid drop.

It is to be noted that: for the purpose of clarity only, in accompanying drawings for illustrating the example(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

Besides, in a case of no conflict, features in one example or in different examples can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A microfluidic system, comprising:
a first base substrate;
a second base substrate, opposite to the first base substrate;
a first electrode, on a side of the first base substrate close to the second base substrate; and
a second electrode, on a side of the second base substrate close to the first base substrate,
wherein the first base substrate and the second base substrate form a cell, the cell is configured to receive a liquid to be detected, the first electrode and the second electrode are configured to drive the liquid to be detected during a first time period, and output a capacitance signal between the first electrode and the second electrode during a second time period, wherein the first electrode comprises a plurality of first sub electrodes insulated from each other, and the second electrode comprises a plurality of second sub electrodes insulated from each other,
in a plan view of the microfluidic system, the plurality of first sub electrodes are arranged in an array in a first direction and in a second direction, the plurality of second sub electrodes are arranged in the second direction, each of the plurality of second sub electrodes extends in the first direction, the first direction is intersected with the second direction, orthographic projections of the plurality of first sub electrodes on the first base substrate are overlapped with orthographic projections of the plurality of second sub electrodes on the first base substrate, and a first interval is provided between two adjacent first sub electrodes arranged in the second direction,
the microfluidic system further comprises: a thin film transistor connected with each of the plurality of first sub electrodes, wherein the first sub electrode is electrically connected with a drain electrode of the thin film transistor.

2. The microfluidic system according to claim 1, wherein a second interval is provided between two adjacent first sub electrodes arranged in the first direction.

3. A microfluidic system, comprising:
a first base substrate;
a second base substrate, opposite to the first base substrate;
a first electrode, on a side of the first base substrate close to the second base substrate; and
a second electrode, on a side of the second base substrate close to the first base substrate,
wherein the first base substrate and the second base substrate form a cell, the cell is configured to receive a liquid to be detected, the first electrode and the second electrode are configured to drive the liquid to be detected during a first time period, and output a capacitance signal between the first electrode and the second electrode during a second time period,
wherein the first electrode comprises a plurality of first sub electrodes insulated from each other, and the second electrode comprises a plurality of second sub electrodes insulated from each other,
in a plane view of the microfluidic system, the plurality of first sub electrodes are arranged in an array in a first direction and in a second direction, the plurality of second sub electrodes are arranged in the second direction, each of the plurality of second sub electrodes extends in the first direction, the first direction is intersected with the second direction, and orthographic projections of the plurality of first sub electrodes on the first base substrate fully fall within orthographic projections of the plurality of second sub electrodes on the first base substrate, a first interval is provided between two adjacent first sub electrodes arranged in the second direction, and a second interval is provided between two adjacent first sub electrodes arranged in the first direction.

4. The microfluidic system according to claim 3, further comprising:
a thin film transistor connected with each of the plurality of first sub electrodes, wherein the first sub electrode is electrically connected with a drain electrode of the thin film transistor.

5. The microfluidic system according to claim 4, wherein gate electrodes of the thin film transistors in a same row are connected with a same gate line.

6. The microfluidic system according to claim 5, wherein source electrodes of the thin film transistors in a same column are connected with a same data line.

7. The microfluidic system according to claim 4, further comprising:
a signal adjusting unit, wherein the signal adjusting unit is configured to adjust a first driving signal inputted to the first sub electrode in real time according to a capacitance detection result.

8. The microfluidic system according to claim 7, wherein the signal adjusting unit is configured to adjust the first driving signal inputted to the first sub electrode by adjusting a position of a turned-on thin film transistor and a source driving signal inputted to a source electrode of the turned-on thin film transistor.

9. The microfluidic system according to claim 8, wherein a source electrode of the thin film transistor is connected with a detection-and-source driver, a gate electrode of the thin film transistor is connected with a gate driver, the detection-and-source driver and the gate driver are connected with the signal adjusting unit, respectively; the detection-and-source driver is configured to input the source driving signal to the source electrode of the turned-on thin film transistor in the first time period, and receive the capacitance signal sensed by the first sub electrode to detect a capacitance change between the first electrode and a corresponding second sub electrode.

10. The microfluidic system according to claim 3, wherein the first electrode and the second electrode are arranged on different sides of the cell.

11. The microfluidic system according to claim 3, wherein the first direction is a row direction, and the second direction is a column direction.

12. The microfluidic system according to claim 3, wherein the first electrode and the second electrode are arranged on different sides of the cell.

* * * * *